United States Patent [19]

Sherman

[11] Patent Number: 4,753,032
[45] Date of Patent: Jun. 28, 1988

[54] CONTACT POISON DELIVERY SYSTEM

[76] Inventor: Daniel A. Sherman, 1355 Bobolink Pl., Los Angeles, Calif. 90069

[21] Appl. No.: 78,841

[22] Filed: Jul. 28, 1987

[51] Int. Cl.[4] ............................................. A01M 1/20
[52] U.S. Cl. .................................................... 43/131
[58] Field of Search ................. 43/131, 124; 119/156, 119/157

[56] References Cited

U.S. PATENT DOCUMENTS

| | | | |
|---|---|---|---|
| 1,229,094 | 6/1917 | Knerr | 119/157 |
| 1,627,516 | 5/1927 | Larson | 119/157 |
| 4,281,471 | 8/1981 | Jenkins | 43/131 |
| 4,349,981 | 9/1982 | Sherman | 43/131 |
| 4,364,194 | 12/1982 | Clark | 43/131 |
| 4,570,377 | 2/1986 | Primavera | 43/131 |
| 4,611,426 | 9/1986 | Willis | 43/124 |
| 4,648,201 | 3/1987 | Sherman | 43/131 |

FOREIGN PATENT DOCUMENTS 8203968 11/1982 PCT Int'l Appl. .................. 43/131

Primary Examiner—Gene P. Crosby

[57] ABSTRACT

A contact poison delivery system relates to the containment of a rodenticide impregnated wick in a "tamper-resistant" containers that will coat a rat or mouse passing through said container with a lethal dose of poison, ingested by the rodent as it preens and cleans itself. The position of the wick and the configuration of the internal structure of the container insures a maximum application to the rodent traversing the device while isolating the wick, its structure and the poisoned substance from prying hands. The device provides the additional advantage of being easily fabricated and for allowing a premeasured and readily definable amount of poison to be encased in a manner that will insure its stability and safe usage.

3 Claims, 1 Drawing Sheet

CONTACT POISON DELIVERY SYSTEM

BACKGROUND OF THE INVENTION

Rodents and their control have been a source of constant problem for mankind throughout the ages. From folk tale through contemporary literature these pests have been rightly depicted as a health hazard and a destroyer of food and harborage, competing with mankind for space and food.

During the past few years a realization that poisoning represented the most effective method of large scale rodent reduction has led to the introduction of several new and innovative devices for the safe containment of the poisoned substances that were formulated to kill rodents as they fed.

The use of poison impregnated powders to deliver the toxin to a rodent as it passed over the powders and then fed were also developed and widely used.

However, as the rodents developed a resistance to various "first generation" baits, the toxicity of the poisons increased until, they not only represented a hazard to the rodents but, the potential for damage to humans, pets and wildlife increased dramatically.

The problem of safe containment and the delivery of these poisoned substances in a manner that isolated them from the environment became of considerable interest as the toxicity of baits to non target species increased and, toward this end, several devices were developed and patented.

Indicative of these devices are the U.S. Patents granted under the following numbers; U.S. Pat. Nos. 43/131-4,132,026-1/1979-Dodds . . . 43/131-4,161,079 7/1979-Hill . . . 43/131-4,281,471-Jenkins . . . 43/131-4,349,981-9/1981-Sherman . . . 43/131-4,031,653-6/1977-Jordan . . . 43/131-4,349,982-9/1982 Sherman . . . 43/131-4,400,904-8/1983-Baker . . . 43/131-4,541,198-9/1985 Sherman . . . 43/131-4,648,201-3/1987-Sherman. Foreign Pat. Nos. 6617388 5/1968 Netherlands, 43/131 . . . 2111022-9/1972 Federal Republic of Germany, 43/131.

Although these devices represented a quantum leap forward in the safe containment and delivery of poisoned baits, they were defective in that they depended on the introduction of a free and independent bait source that attracted the rodent to feed or, as in the case of the Sherman patent 4,349,981, depended upon the introduction of a poisoned powder that could be shaken loose from the container if it were tipped.

An object of the present art is to provide the user with a device that has as part of its construction an enclosed wick, coated with a poisoned substance, that has been deeply impregnated into the material. By providing a limited space for the rodent to pass through the wick containment area the rodent is forced into tight contact with the poison impregnated material, thereby squeezing enough material onto the rodents coat to insure that as it preens and cleans itself, it will ingest a lethal dose of the toxicant.

Still another object of the instant invention is to isolate the wick and its containment area in such a manner to preclude the possibility of it being touched by children and non-target species.

Further, the instant invention provides a passageway that conforms to the patterns of behavior of an active rodent population by presenting a tight harborage that forms a channel along a wall, similiar to the tight spaces that rodents run and hide in.

A further object of the invention is to provide a form of containment for the wick that can be positioned within the device for the most effective dispersion of the poisoned substance contained in the wick for the most effective delivery to the target rodent.

Although the art depicts the invention as an improvement on the Sherman Pat. No. 4,648,201 by placing the wick and wick containment structure in a triangular tunnel structure with baffled ends as claimed in the said Sherman patent, the invention is meant to stand on its own based upon its unique merits and design.

The totality of the invention is based upon it the ability to place and isolate the wick and wick containment structure in a manner that prevents contact in an unintended manner while forcing the target rodent to traverse the wick containment structure in order to pass through the device and exit the opposing end.

The aforementioned objectives are all achieved in the instant invention and these and other objects, advantages and novel features of the invention will become apparent when considered with the following description and in conjunction with the accompanying drawings.

The scope and teachings of the invention contained herein are not limited to the drawings but carry forward to all rodenticide delivery systems that contain a solution, impregnated into a wick and delivered to a target species by forcing said target species into a tight enclosure thereby delivering a dose of toxicant directly onto the coat of the animal.

DETAILED DESCRIPTION OF THE DRAWINGS

Figure 1:
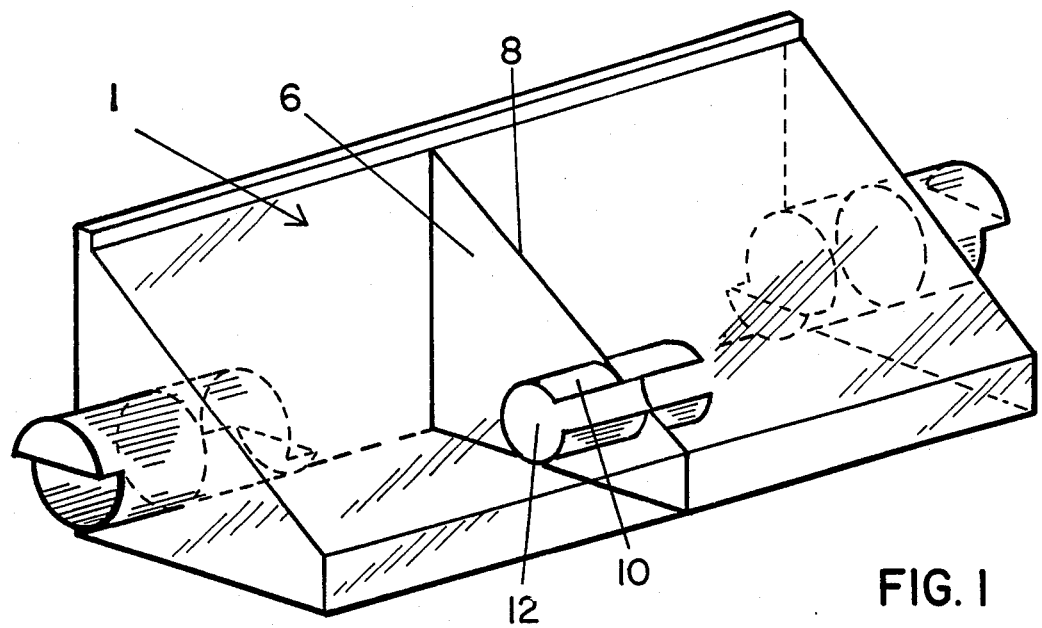
FIG. 1 depicts the total structure of the containment system showing the wick containment structure having been placed in a centrally disposed position in relation to the opposing openings at the end of the tube. Depicted are the baffle properties of the wall that surrounds the wick containment structure and that prevent the rodent from traversing the length of the tube without going through the wick containment structure. For the purposes of the graphic visualization of the invention, the wick containment strucutre has been depicted as appearing towards the front of the baffle. This structure may however, be moved to an alternate position in the baffle wall to facilitate placement of the wick containment structure in different shapes of tubes. The distance from the openings at either end to the closest point of contact with the wick, when used in an unbaffled tube, as depicted, will be a minimum of 3 inches, to prevent a child from reaching in and contacting the wick.
Figure 2:
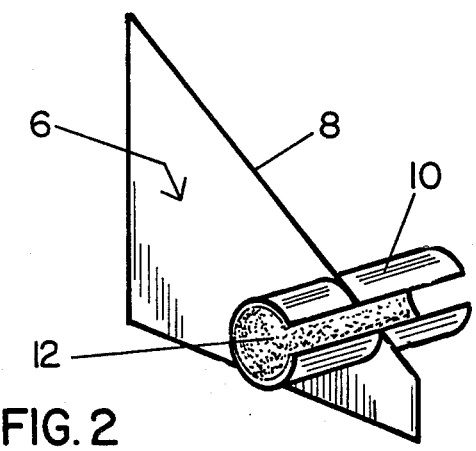
FIG. 2 is a detail of the centrally disposed wall showing the positioning of the wick containment structure in perspective to the baffle wall and depicting the positioning of the wick within the structure.

As can be seen by reference to FIG. 1 the Contact Poison Delivery System is generally formed as a tubular structure 1 with an optional baffled entrance and egress port at opposing ends. Said tube is divided in its interior by a solid baffle wall 6 that prevents free traverse of the tube structure 1 by a rodent entering either of the opposing portals. The sides of the internal baffle strucutre 6 are formed in a manner 8 so that they provide a flush, tight fit with the interior of the tube. The only breach in said interior baffle 6 in provided by a smaller passageway 10 formed as an interior tube that runs in the same general direction as the main tubular structure. Said tube 10 is designed with a wick 12 in its interior and said wick is impregnated with a toxicant that leaches out as the rodent is forced to squeeze through the reduced space provided by the tube 10 in order to reach the opposing side.

As can be seen in drawing 2 the interior baffle wall 6 is actually an independent member that can be placed at various positions within the exterior tube of the Contact Poison Delivery System dependent upon the type of non-target species that might be present. The shape of the interior baffle 6 is dimensioned 8 to fit precisely to the shape of exterior tube structure providing a friction fit that allows said adjustment. The interior passageway tube formed as 10 is restricted in its relationship to the general opening of the exterior tube forcing the rodent, traveling forward in the structure to advance into contact with the toxicant contained in the poison impregnated wick 12 and insuring positive contact and coating of the rodent with said toxicant.

Figure 3:
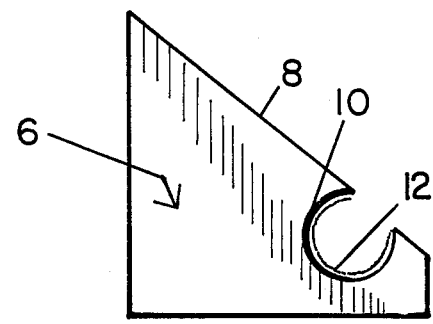
FIG. 3 is a side view of the baffle wall depicting the relationships between the wick, the containment structure and the wall. Shown in this drawing is the reduced space that the rodent must traverse in order to reach the opposing end and, how this causes pressure to be exerted on the wick, delivering the toxicant on to the coat of the rodent.

FIG. 3 is a side view perspective of the baffle structure 6 that demontrates that the interior passageway tube 10 had been partially cut along the top wall 8 to form an opening for the insertion of the wick 12. This provides a method of rapid fabrication of the interior passageway tube 10 by allowing the wick 12 to be glued to its interior by simply pressing the wick through the extended opening in its length. Also shown is the reduction of the size of the interior baffle 6 in relation to the interior tube structure as formed by the outer dimension of said wall 8 which has been designed for a flush fit in the interior tube structure.

Figure 4:
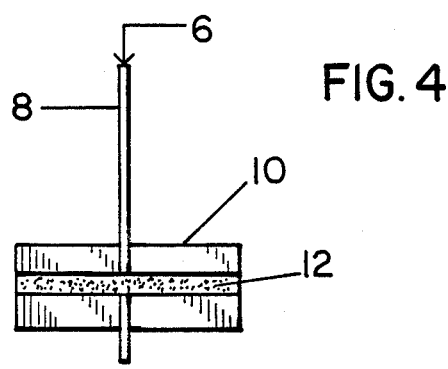
FIG. 4 is a front view of the baffle wall, again depicting the relationship between the wall and the wick containment structure but, in addition, showing that the containment structure, depicted as a tube that passes through the wall, has an opening, running the entire length of the tube, that allows for the rapid pacement of the wick in the structure and, allows for the easy dosing of the wick with the toxicant.

FIG. 4 represents a front view of the baffle wall 6, again demonstrating the opening in the interior passageway tube along wall 8 and demonstrates that the interior passageway 10 penetrates the baffle wall 6 from either side to provide an elongated tunnel of reduced dimension that will accomodate the poison impregnated wick 12. This is an especially important feature of the invention as it allows the fabrication of the Contact Poison Delivery System with a wick, the size of which has been determined by the relative toxicity of the material that is to be impregnated into wick 12. The opening formed in the dimensional wall 8 in relation to the passageway tube 10 allows the exposure of the wick 12 for dosing along its entire length with the toxicant after the wick 12 has been placed into the passageway tube 10. This minimizes the potential exposure to the toxicant by the person dosing the wick 12 with the substance and provides for a uniform coating of the wick 12.

What I claim is:

1. A contact poison delivery system, said system being comprised of a tubular stucture; said tubular stucture having in its interior a baffle wall; said baffle wall being breached by an interior passageway tube of reduced dimension running generally in the same direction as the tubular structure; said passageway tube having been coated with a wick material; said wick material having been impregnated with a liquid toxicant capable of leaching out and coating a rodent as it passes through said restricted passageway tube.

2. A contact poison delivery system as in claim 1 wherein said interior passageway tube is contained in an independent baffle structure defining said baffle wall; said baffle wall being positioned intermediate terminate ends of said tubular structure.

3. A contact poison delivery system as in claim 2 wherein said passageway tube has been constructed with an opening running its entire length that allows the introduction of said wick material along the entire length of said passageway tube.

* * * * *